United States Patent
Gandy et al.

(10) Patent No.: US 7,484,651 B2
(45) Date of Patent: Feb. 3, 2009

(54) METHOD TO JOIN OR REPAIR SUPERALLOY HOT SECTION TURBINE COMPONENTS USING HOT ISOSTATIC PROCESSING

(75) Inventors: David Wayne Gandy, Concord, NC (US); Gregory J. Frederick, Harrisburg, NC (US); Andrew McGehee, Harrisburg, NC (US); Artie Gene Peterson, Jr., Concord, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

(21) Appl. No.: 10/972,247

(22) Filed: Oct. 22, 2004

(65) Prior Publication Data
US 2006/0086776 A1    Apr. 27, 2006

(51) Int. Cl.
B23K 20/00    (2006.01)
(52) U.S. Cl. .................. 228/193; 228/128; 228/119
(58) Field of Classification Search .............. 228/193, 228/262.3, 194, 186, 127, 128, 119
See application file for complete search history.

(56) References Cited

U.S. PATENT DOCUMENTS

| | | | |
|---|---|---|---|
| 1,554,546 | A | 9/1925 | Austin |
| 2,681,970 | A | 6/1954 | Koopman |
| 2,870,323 | A | 1/1959 | Roper et al. |
| 2,914,847 | A * | 12/1959 | Storchheim ............. 228/126 |
| 2,932,723 | A | 4/1960 | Sibley et al. |
| 2,938,107 | A | 5/1960 | Pease |
| 3,185,814 | A | 5/1965 | Rösser et al. |
| 3,215,809 | A | 11/1965 | Morimoto et al. |
| 3,223,818 | A | 12/1965 | Chyle |
| 3,268,248 | A * | 8/1966 | Chambers ............. 285/288.6 |
| 3,274,371 | A | 9/1966 | Manz et al. |
| 3,293,400 | A | 12/1966 | Brogdon |

(Continued)

FOREIGN PATENT DOCUMENTS

DE    19917071 A1 * 10/2000

(Continued)

OTHER PUBLICATIONS

U.S. Appl. No. 10/972,249, filed Oct. 22, 2004, Coleman et al.

(Continued)

*Primary Examiner*—Kevin P Kerns
*Assistant Examiner*—Michael Aboagye
(74) *Attorney, Agent, or Firm*—Kilpatrick Stockton LLP

(57) ABSTRACT

Accordingly, the present invention provides a method for joining metallic members, which can be used to join component sub-assemblies. Further, the present invention provides a method for repairing a component by replacing a damaged portion and re-inserting a replacement section. In general, the present invention provides in one embodiment a method for joining metallic members comprising: preparing a surface of a first metallic member, thereby providing an oxide-free surface; preparing a surface of a second metallic member, thereby providing an oxide-free surface; applying pressure to the first and second metallic members, thereby forcing the surface of the first metallic member and the surface of the second metallic member together and forming a joint area; sealing an outer edge of the joint area; and subjecting the members to a hot isostatic process operation.

28 Claims, 2 Drawing Sheets

U.S. PATENT DOCUMENTS

| | | | |
|---|---|---|---|
| 3,420,979 A | 1/1969 | Gowan | |
| 3,546,415 A | 12/1970 | Marantz | |
| 3,549,856 A | 12/1970 | Saenger et al. | |
| 3,624,345 A | 11/1971 | Armstrong | |
| 3,745,322 A | 7/1973 | Ito et al. | |
| 3,746,833 A | 7/1973 | Ujie | |
| 3,936,654 A | 2/1976 | Cannata | |
| 3,936,655 A | 2/1976 | Arnoldy | |
| 3,957,194 A | 5/1976 | Woodward | |
| 3,978,907 A | 9/1976 | Rabinovich et al. | |
| 3,984,652 A | 10/1976 | Graville | |
| 4,008,844 A | 2/1977 | Duvall et al. | |
| 4,020,314 A | 4/1977 | Barger | |
| 4,027,135 A | 5/1977 | Barger | |
| 4,091,253 A | 5/1978 | Bagshaw et al. | |
| 4,143,257 A | 3/1979 | Herrmann | |
| 4,149,060 A | 4/1979 | Barger | |
| 4,183,351 A * | 1/1980 | Hinotani et al. | 126/652 |
| 4,214,141 A | 7/1980 | Okuda et al. | |
| 4,224,360 A | 9/1980 | Ohnishi et al. | |
| 4,266,110 A | 5/1981 | Barger | |
| 4,307,281 A | 12/1981 | Ivannikov et al. | |
| 4,400,608 A | 8/1983 | Wagatsuma et al. | |
| 4,442,340 A | 4/1984 | Kawabata et al. | |
| 4,484,959 A | 11/1984 | Boucher et al. | |
| 4,518,625 A | 5/1985 | Westfall | |
| 4,521,664 A | 6/1985 | Miller | |
| 4,572,936 A | 2/1986 | Scholz et al. | |
| 4,584,457 A | 4/1986 | Dilthey et al. | |
| 4,587,700 A * | 5/1986 | Curbishley et al. | 29/889.2 |
| 4,603,801 A * | 8/1986 | Wan et al. | 228/194 |
| 4,611,744 A | 9/1986 | Fraser et al. | |
| 4,702,406 A | 10/1987 | Sullivan et al. | |
| 4,703,885 A | 11/1987 | Lindgren et al. | |
| 4,750,944 A | 6/1988 | Snyder et al. | |
| 4,780,594 A | 10/1988 | Rothermel | |
| 4,782,206 A | 11/1988 | Ayres et al. | |
| 4,788,412 A | 11/1988 | Hori et al. | |
| 4,804,815 A | 2/1989 | Everett | |
| 4,811,892 A * | 3/1989 | Kunzmann et al. | 228/194 |
| 4,814,026 A * | 3/1989 | Schlosser | 148/220 |
| 4,817,858 A | 4/1989 | Verpoort | |
| 4,835,357 A | 5/1989 | Schalk | |
| 4,878,953 A | 11/1989 | Saltzman et al. | |
| 4,902,873 A | 2/1990 | Ivannikov | |
| 5,067,649 A | 11/1991 | Hardwick | |
| 5,071,054 A | 12/1991 | Dzugan et al. | |
| 5,106,010 A | 4/1992 | Stueber et al. | |
| 5,124,527 A | 6/1992 | Takano et al. | |
| 5,140,140 A | 8/1992 | Pollack | |
| 5,146,064 A | 9/1992 | Poirier | |
| 5,149,939 A | 9/1992 | Imaizumi et al. | |
| 5,156,321 A | 10/1992 | Liburdi et al. | |
| 5,214,265 A | 5/1993 | Pollack | |
| 5,215,243 A * | 6/1993 | Findlan | 228/119 |
| 5,217,158 A | 6/1993 | Spiegelberg et al. | |
| 5,233,149 A | 8/1993 | Killian et al. | |
| 5,280,849 A | 1/1994 | Galanes | |
| 5,348,212 A | 9/1994 | Galanes | |
| 5,374,319 A | 12/1994 | Stueber et al. | |
| 5,383,985 A | 1/1995 | Coulon | |
| 5,470,524 A | 11/1995 | Krueger et al. | |
| 5,479,704 A | 1/1996 | Richter et al. | |
| 5,556,561 A | 9/1996 | Ishikawa et al. | |
| 5,593,085 A * | 1/1997 | Tohill et al. | 228/193 |
| 5,714,735 A | 2/1998 | Offer | |
| 5,723,078 A | 3/1998 | Nagaraj et al. | |
| 5,732,467 A * | 3/1998 | White et al. | 29/889.1 |
| 5,735,044 A | 4/1998 | Ferrigno et al. | |
| 5,755,374 A | 5/1998 | Prigmore | |
| 5,762,727 A | 6/1998 | Crawmer et al. | |
| 5,783,318 A | 7/1998 | Biondo et al. | |
| 5,806,751 A | 9/1998 | Schaefer et al. | |
| 5,822,852 A | 10/1998 | Bewlay et al. | |
| 5,846,057 A | 12/1998 | Ferrigno et al. | |
| 5,897,801 A | 4/1999 | Smashey et al. | |
| 5,951,792 A | 9/1999 | Balbach et al. | |
| 5,956,845 A | 9/1999 | Arnold | |
| 5,994,659 A | 11/1999 | Offer | |
| 6,023,043 A | 2/2000 | Manabe et al. | |
| 6,040,545 A | 3/2000 | Taki et al. | |
| 6,049,978 A | 4/2000 | Arnold | |
| 6,069,334 A | 5/2000 | Capitanescu | |
| 6,109,505 A | 8/2000 | Malie et al. | |
| 6,117,564 A | 9/2000 | Crawmer et al. | |
| 6,153,854 A | 11/2000 | Haszler et al. | |
| 6,193,145 B1 | 2/2001 | Fournier et al. | |
| 6,247,638 B1 | 6/2001 | Ress | |
| 6,364,971 B1 | 4/2002 | Peterson, Jr. et al. | |
| 6,428,633 B1 | 8/2002 | Kasuya et al. | |
| 6,464,129 B2 * | 10/2002 | Stueber et al. | 228/194 |
| 6,579,431 B1 * | 6/2003 | Bolcavage et al. | 228/194 |
| 6,673,169 B1 | 1/2004 | Peterson, Jr. et al. | |
| 6,884,959 B2 | 4/2005 | Gandy et al. | |
| 7,060,366 B2 * | 6/2006 | Gupta et al. | 428/632 |
| 2005/0126664 A1 | 6/2005 | Peterson, Jr. et al. | |

FOREIGN PATENT DOCUMENTS

| | | |
|---|---|---|
| JP | 56009093 | 1/1981 |

OTHER PUBLICATIONS

U.S. Appl. No. 10/839,863, filed May 5, 2004, Coleman et al.
U.S. Appl. No. 11/060,937, filed Feb. 18, 2005, Peterson, Jr. et al.
ASM Handbook, vol. 7, Powder Metal Technologies and Applications, p. 605, ASM International, 1998.
Chapter 6: Submerged Arc Welding, pp. 192-203.
Chapter 8: Electroslag Welding, pp. 272-283.
Gandy, et al., "Overview of Hot Section Component Repair Methods," *ASM Materials Solutions Conference & Exposition, Energy & Utilities Program*, St. Louis, MO, Oct. 9-11, 2000.
Gandy, et al., "Laser Weld Repair of IN738 and GTD111 Buckets" *Proceeding of ASME Turbo Expo 2002*, Jun. 3-6, 2002, Amsterdam, The Netherlands.
Gandy, D.W., Frederick, G., Viswanathan, R., and Stover, J.D., "Recent EPRI Research & Development Activities in the Weld Repair of Nickel-Based Gas Turbine Blade Superalloys," *EPRI Welding & Repair Technology for Power Plants, 3rd International Conference Proceedings*, Jun. 9-12, 1998.
Gandy, D.W., Viswanathan, R., and Stover, J.D., "Status of Weld Repair Technology for Nickel-Based Superalloy Gas Turbine Blading," *EPRI Final Report*, Apr. 1998.
Hanes, H.D., Seifert, D.A., and Watts, C.R., "Hot Isostatic Processing," *Metals and Ceramics Information Center, Battelle's Columbus Laboratories*, pp. 1-2, 31-32, 46-48, and 58, 1979.
Rinaldi, C. et al., "Automatic Refurbishment of Gas Turbine Components by CO2 Robo-Laser," *Proceedings from Materials Solutions '97 on Joining and Repair of Gas Turbine Components*, pp. 109-117, Sep. 15-18, 1997.
Simkovich, G. and Whitney, E., "Improved Nickel Based Superalloy With Excellent Oxidation Resistance and Weldability," *The Pennsylvania State University*, Jul. 17, 1997.
Viswanathan, R. and Scheibel, J., "Assessment of the Laser Welding Process for Superalloy Gas Turbine Blade Welding," *EPRI Repair and Replacement Applications Center, Final Report*, Oct. 1999.
Williams, A.D., "A Case Study of Laser Powder Feed Welding Under Engine Operating Conditions," *EPRI Welding & Repair Technology for Power Plants, 3rd International Conference Proceedings*, Jun. 9-12, 1998.

\* cited by examiner

METHOD TO JOIN OR REPAIR SUPERALLOY HOT SECTION TURBINE COMPONENTS USING HOT ISOSTATIC PROCESSING

BACKGROUND OF THE INVENTION

1. Field of the Invention

The present invention relates to a method of joining metallic parts. In particular, the present invention relates to a method of joining superalloy sub-components and repairing a component by removing a damaged portion and re-inserting a replacement section.

2. Description of Related Art

Industrial gas turbine (IGT) blades are produced in one of three basic forms: equiaxed, directionally solidified or single crystal. In any of these cases, castings for IGT blades have become extremely large and costly. As the blades become larger and the casting processes become more sophisticated, casting yields tend to decrease, resulting in extra re-melting and casting costs in an effort to recycle defectively produced blades. Low casting yields of large turbine blades also make large volume manufacturing inefficient and expensive. This decrease in casting yields can be attributed to the fact that the casting of large sections inherently induces more defects. To avoid this issue, many manufacturers have been finding ways to join smaller blade components, known as sub-assemblies, to form a single large turbine blade.

Moreover, modern high temperature superalloy articles, such as nickel-based, precipitation strengthened superalloys used in the manufacture of rotating gas turbines blades, comprise complex alloys at the cutting edge of high temperature metallurgy. Over the years, superalloy materials have been developed to provide mechanical strength to turbine blades and vanes operating at high temperatures. As these turbine blades are difficult and expensive to manufacture, it is desirable to repair a damaged blade than to replace one.

Typically, aero and IGT hot section components are repaired using either welding or brazing methods. Both methods have been successfully applied to a variety of hot section turbine component materials including nickel-, cobalt-, and iron-based superalloys. Stationary components, such as vanes (also known as nozzles), transition pieces, or combustor liners or combustors are the most often repaired hot section components. Repairs on stationary components may be performed over virtually the entire component due to the lower stresses experienced during operation because these components experience only operational and thermal stresses and do not experience the high rotational stresses experienced by blades (buckets) or discs.

However, various issues or limitations appear when brazing or welding methods have been used to repair turbine blades. For example, narrow gap brazing techniques have been plagued by joint contamination that results in incomplete bonding, even when elaborate thermo-chemical cleaning processes precede the brazing operation. Narrow gap brazing also lacks the ability to restore damaged or missing areas on the blade. Joints formed using wide gap brazing methods can be difficult to set-up, and porosity in the deposited filler material continues to be a concern. Gas Tungsten Arc Welding (GTAW) and Plasma Transferred Arc Welding (PTAW), while the most commonly used methods for blade repairs today, require the use of lower strength fillers in order to avoid cracking, which limits which parts of the blade that can be welded.

Due to these limitations, blade repairs are limited to the lower stress regions of the blade airfoil. Thus, some 80 to 90 percent of blade surfaces are non-repairable, and such non-repairable blades are generally returned to suppliers as scrap for credit against replacement blades. The financial impact of this is significant for the utility industry. For example, a single air-cooled, row 1 rotating blade may cost up to thirty-five thousand dollars to replace, and, depending on the turbine manufacturer and model, there are approximately 90 to 120 blades in a typical row. Thus, the need to develop an improved method to repair damaged blades by joining the damaged blade with a replacement superalloy piece would be desirable.

As noted, it would be desirable to provide an improved technique for joining superalloy parts, such as superalloy turbine blade sub-assemblies, that are subject to high temperatures and stresses, including operational, thermal, and rotational stresses. It also would be desirable to provide an improved technique for repairing damaged turbine blades by joining the damaged blade with a replacement superalloy piece, regardless of the location of the damaged area.

SUMMARY OF THE INVENTION

Accordingly, the present invention provides a method for joining metallic members, which can be used to join component sub-assemblies. Further, the present invention provides a method for repairing a component by removing a damaged portion and re-inserting a replacement section.

In general, the present invention provides in one embodiment a method for joining metallic members comprising: preparing a surface of a first metallic member, thereby providing an oxide-free surface; preparing a surface of a second metallic member, thereby providing an oxide-free surface; applying pressure to the first and second metallic members, thereby forcing the surface of the first metallic member and the surface of the second metallic member together and forming a joint area; sealing an outer edge of the joint area; and subjecting the members to a hot isostatic process operation. In other embodiments, the surface of the first metallic member and the surface of the second metallic member may each comprise an interlocking section, in which the interlocking section of the first metallic member fits into the interlocking section of the second metallic member.

In another embodiment, the present invention provides a method for joining metallic members comprising: preparing a surface on a first metallic member and a surface on a second metallic member by surface grinding, grit blasting, grinding, polishing, chemical cleaning or combinations thereof; positioning the surface on the first metallic member physically against the surface on the second metallic member are brought tightly together, thereby forming a joint area, wherein the positioning further comprises applying pressure on the first metallic member and the second metallic member to ensure closer physical contact between the surface on the first metallic member and the surface on the second metallic member; sealing an outer edge of the joint area by a seal weld; and subjecting the members to a hot isostatic processing operation.

Moreover, the present invention provides in an embodiment a method for repairing a work piece, comprising: replacing a damaged portion of a work piece with a metallic member; preparing a surface of the work piece; preparing a surface of the metallic member; applying pressure to the work piece and the metallic member, thereby forcing the surface of the work piece and the surface of the metallic member together and forming a joint area; sealing an outer edge of the joint area; and subjecting the members to a hot isostatic process operation. In alternative embodiments, the surface of the work piece and the surface of the metallic member may each comprise an interlocking section, in which the interlocking section of the work piece fits into the interlocking section of the metallic member.

DESCRIPTION OF THE PREFERRED EMBODIMENTS

Generally, the present invention provides an improved method for joining metallic parts, specifically, superalloy sub-components, to form a single metallic component. The present invention also provides an improved method for repairing a superalloy metallic component by removing the damaged portion with a new portion rather than completely replacing the component. Additionally, the present invention provides an improved method that helps form stronger joints between metallic parts, even in areas subject to high stress and temperatures. The following text in connection with the Figures describes various embodiments of the present invention. The following description, however, is not intended to limit the scope of the present invention.

Figure 1:
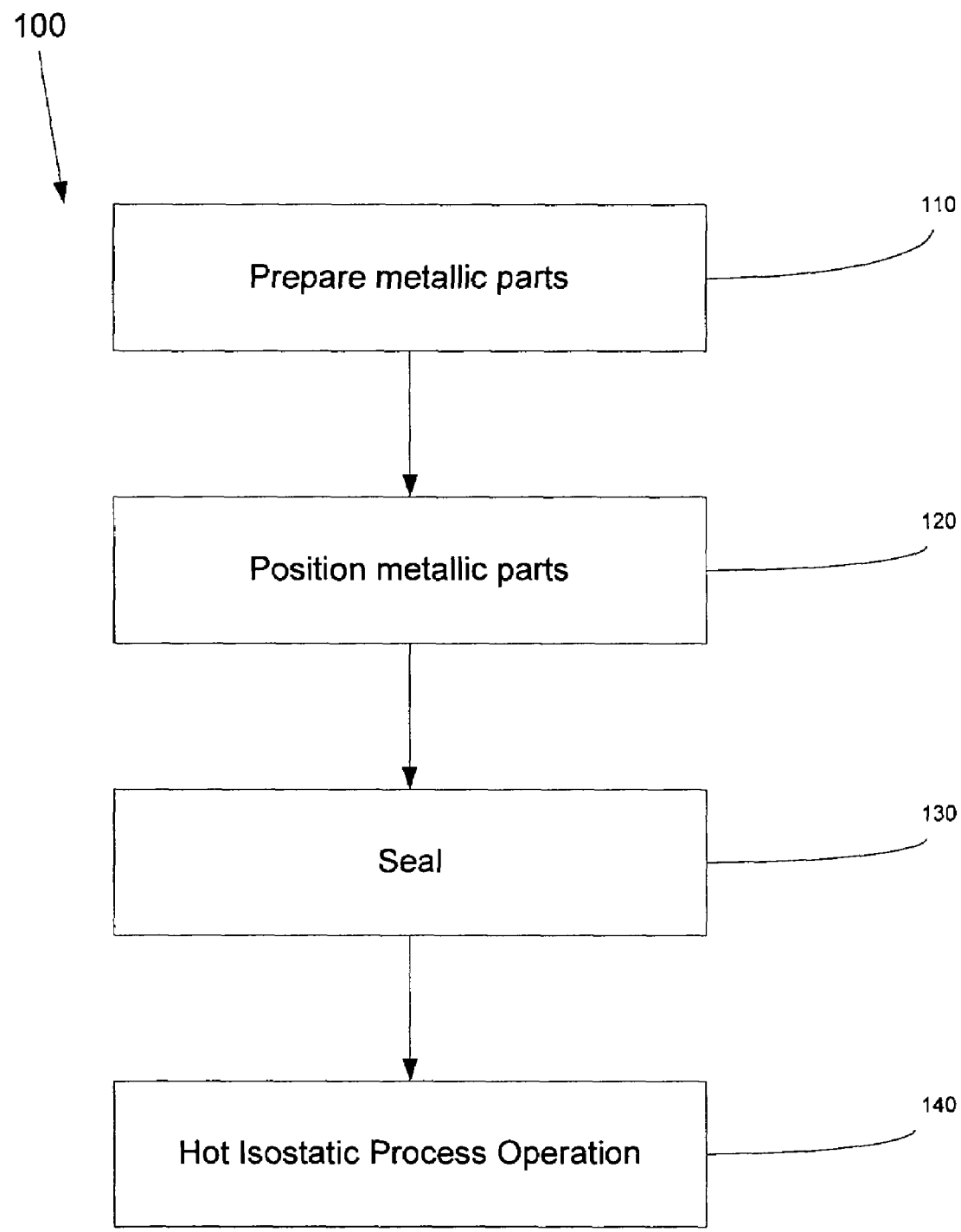
FIG. 1 is a flowchart illustrating a method according to one embodiment of the present invention.

FIG. 1 is a flowchart illustrating a method according to one embodiment of the present invention. A process 100 is used in joining metallic parts. In step 110, the metallic parts are first prepared, to reduce the amount of oxide on the surfaces of the metallic parts and to clean the surfaces. Any suitable means can be employed to prepare the surfaces, as long as the surfaces become clean and the oxide is reduced to a minimum, preferably making the surface oxide-free after preparation. In a preferred embodiment, step 110 can be achieved by a combination of surface grinding, grit-blasting, grinding/polishing, or fluoride ion cleaning (FIC). After the surfaces have been prepared, some care should be exercised in the handling of the metallic parts so that the joining surfaces do not get inadvertently contaminated, damaged or oxidized. A clean and oxide-free surface facilitates the eventual formation of a strong metallurgical bond. It is also advisable to process the metallic parts shortly after this preparation step 110.

It should be appreciated that the two metallic parts to be joined can be any type of steel. However, in a preferred embodiment, the present invention is used to join superalloy steel pieces together and more preferably to join nickel-based or cobalt-based superalloy pieces. It should be appreciated that the present invention enables these types of superalloy steel pieces to be joined to form or repair turbine blades, turbine vanes, jet engine components, or other components used in aerospace applications.

In the next step 120, the pieces are positioned together. The prepared surfaces of the two metallic parts are brought into physical contact with each other, thereby creating mating surfaces for the joint to be formed. Any means can be used to bring the mating surfaces together such as, but not limited to, manually positioning the metallic parts together or using a custom device to guide the metallic parts so that they contact each other at precise locations on the mating surfaces. Pressure is then applied to the metallic parts to minimize any space between the mating surfaces. Any means known in the art can be used to apply pressure, such as, but not limited to, placing the metallic parts in a vise. The amount of pressure varies, depending on how easily close, tight contact can be achieved between the metallic pieces, which may be a function of size, geometry, and other physical conditions of the mating surfaces. However, pressure should not be misapplied such that the metallic parts, especially the mating surfaces, become inadvertently damaged. Thus, some care should be exercised when applying pressure with respect to the amount of pressure and the direction in which the pressure is applied.

Subsequently in step 130, the joint formed where the mating surfaces are in contact is then sealed. A seal weld is preferably applied around the outer edge of this joint area, which also establishes the necessary pressure boundary between the mating surfaces. Any welding means known by one of skill in the art can be used to create the seal weld such as, but not limited to, gas welding, flux-cored arc welding, metal-cored arc welding, gas metal arc welding, submerged arc welding, gas tungsten arc welding, plasma transferred arc welding, electroslag welding, laser beam welding, electron beam welding, etc. The seal weld should cover all outer edges of the joint area to prevent any contamination or fluid leakage into the joint area. The seal weld is important in that it eliminates the potential for oxidation or contamination during hot isostatic processing (HIP), which can lead to poor bonding between the two metallic parts. Even though the seal weld in this embodiment does provide some means to join the two metallic pieces, it is not designed to provide mechanically strong connections, unlike the welds created by welding filler materials to the mating surfaces of work pieces. The seal weld must be suitable to withstand the pressure of HIP without rupture. Rupture of the seal weld would lead to failure of the bond due to equalization of the HIP pressure with the contact pressure of the mating faces.

It should be appreciated that the sealing of the outer edges of the joint area of the two metallic parts is not limited to the use of seal welds. Any suitable sealing media may be used to seal off the outer edges of the joint area. Given that the metallic parts will be undergoing HIP, the sealing media must be one that can withstand the high temperature and high pressure environment of HIP. For example, high temperature waxes similar to those used in the casting industry may be used as a sealing media. Further, one skilled in the art can use any suitable sealing method as long as the other types of seals do not degrade when the metallic parts undergo HIP. For example, the use of brazing to seal off the joint area is likely ineffective because most braze fillers would break down at HIP temperatures.

In step 140, after the outer edges of the joint area have been properly sealed off, the joined metallic parts undergo HIP. HIP can be performed in a pressure vessel or furnace, in which the joined metallic parts are subject to high temperatures and isostatic gas pressure (usually inert, i.e., argon). The maximum temperature and pressure for HIP vessels is about 2000° C. and 175-200 MPa, respectively. The operational pressure ranges of HIP can be between 100 to 200 MPa. The operational temperature ranges of HIP can be within 50% to 80% of the metallic parts' melting temperature, which is usually in the temperature range for solution annealing.

Solutioning can be beneficial for nickel-based alloys to render them less brittle and more workable. The metal and other included materials are heated to a common phase and then cooled very rapidly and uniformly with time and temperature to prevent any subsequent precipitation of secondary phases such as gamma prime, which tends to strengthen the overall alloy matrix and thus provides resistance to HIP pressures. These temperatures, coupled with the high pressures generated from the HIP process, tend to close voids that might have existed in the original casting as well as those that are induced by creep deformation during service exposure. Closing these voids aids in crack prevention since it lowers the number of potential crack initiation sites. HIP also re-establishes the gamma/gamma prime microstructure that provides much of the material's strength. Even though HIP is used to re-condition the microstructure of the alloy to near new condition, it is also utilized in this embodiment of the present invention as a means to create a strong metallurgical bond between the two metallic parts by closing off any gaps left after pressure has been applied to the mating surfaces as discussed in step 120.

In an alternate embodiment of the present invention, the mating surfaces of the metallic parts to be joined have interlocking sections, so that the interlocking section from each metallic part can be inserted into a corresponding area in the interlocking section of the other metallic part when the metallic parts are brought into contact with each other. The interlocking sections on the metallic parts can be of any geometry or configuration as long as the interlocking section on each metallic part can be inserted into a corresponding area in the interlocking section of the other metallic part, thereby facilitating the metallic parts to snugly fit into each other. For example, the interlocking sections of each metallic part can have the same geometry or configuration, such as an alternating series of rectangular raised areas and grooves, where the rectangular raised areas of one metallic part can be inserted into the corresponding groove on the other metallic part. The interlocking section of each metallic part may have a different geometry or configuration, but their respective interlocking section form a mating pair. For example, the first metallic part has an interlocking section comprising a cylindrical raised area while the second metallic part has an interlocking section comprising a recessed area configured to receive the cylindrical raised area of the first metallic part.

The process 100 in this alternate embodiment remains similar, except that the positioning step 120 may require a more precise alignment of the metallic parts based on the geometry or configuration of the interlocking sections as described above. The precise alignment of the metallic parts should occur before pressure is applied. Once properly aligned, the interlocking sections of the metallic parts should be snugly fitted into each other, so that the metallic parts cannot be easily separated from each other. After pressure has been applied, there should be even fewer, if any, spaces between the metallic parts because of the tighter fit of the interlocking sections and the applied pressure, and the metallic parts should be difficult to separate at this point.

Any means known in the art may be used to create a tight fit between the interlocking sections after they have been precisely aligned into each other. In one embodiment, shrink-fitting is used, in which the metallic parts are immersed in a low temperature dry ice solvent or liquid nitrogen. During this cold immersion, the metallic parts contract, which allows the interlocking sections to fit into each other. The fit between the interlocking sections become very snug after the metallic parts are warmed to room temperature and allowed to expand.

Figure 2:
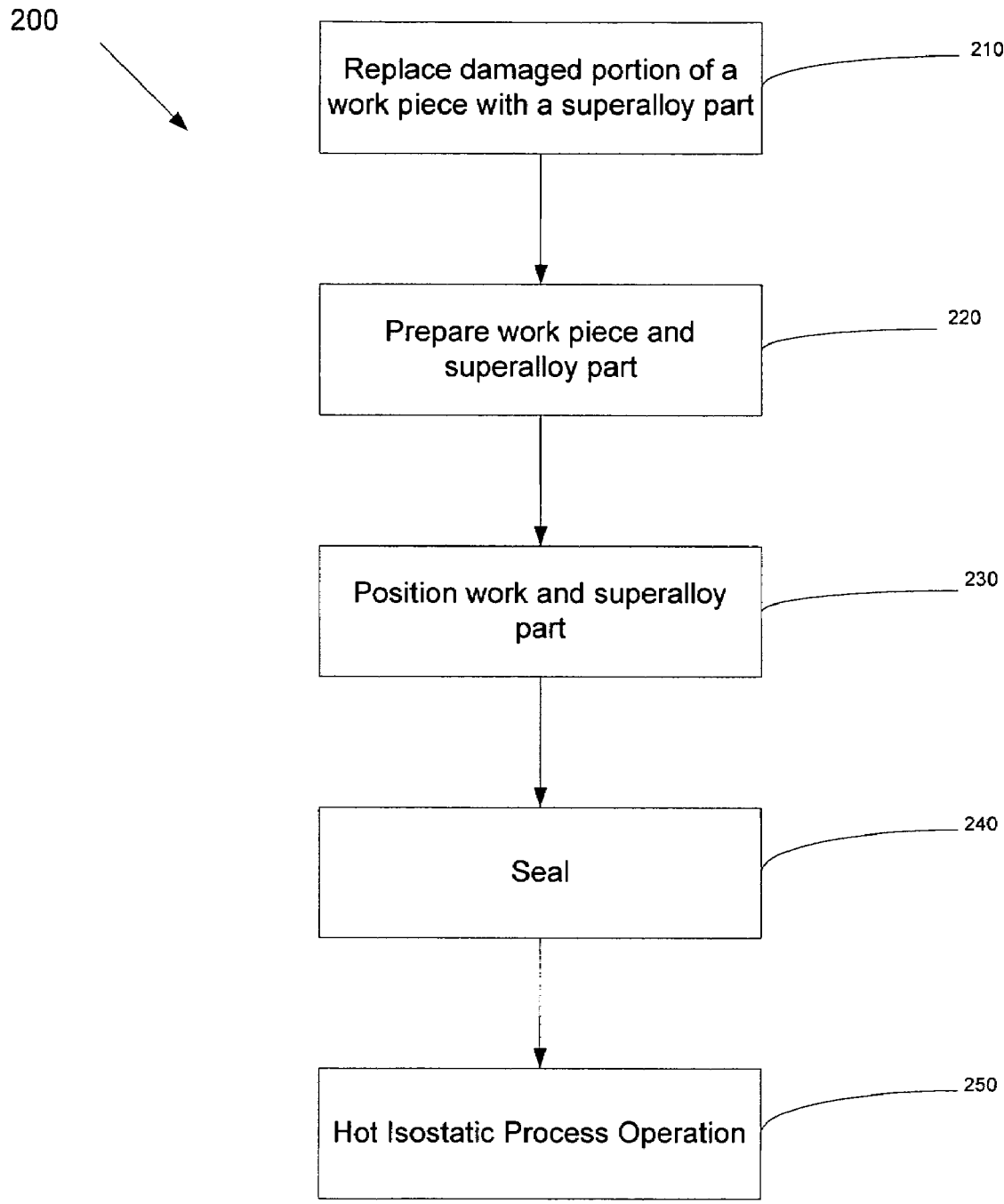
FIG. 2 is a flowchart showing a method according to another embodiment of the present invention.

FIG. 2 is a flowchart showing a method according to another embodiment of the present invention. The process 200 is used to repair superalloy components. In step 210, the damaged portion of a work piece is replaced with a superalloy part. It should be appreciated that the work piece is made of a superalloy as well. The damaged portion can be removed by any means known in the art, and the removal of the damaged portion should be done carefully without exacerbating the condition of the remaining portion of the work piece. To ensure the best possible repair, the superalloy part used to replace the damaged portion should be comparable to the size and shape of the damaged portion, and the same type of superalloy should be used.

Next, in step 220, the work piece and the superalloy part are prepared to reduce the amount of oxide on the surfaces to be joined and to clean these surfaces. A clean and oxide-free surface facilitates the eventual formation of a strong metallurgical bond. As described earlier, any means known by one of skill in the art can be used to prepare these surfaces. Similar to step 110, the preparation of these surfaces is preferably achieved by a combination of surface grinding, grit-blasting, grinding/polishing, or fluoride ion cleaning (FIC). After these surfaces have been prepared, the work piece and superalloy part should be handled carefully, so that their surfaces do not get inadvertently contaminated, damaged or oxidized. It is also advisable to process the work piece and superalloy part shortly after this step 220.

In step 230, the work piece and superalloy part are positioned together, so that their respective prepared surfaces are brought into physical contact with each other, thereby creating mating surfaces for a joint to be formed. In a repair process 200, the mating surface on the work piece generally comes from the area where the damaged portion was removed. In this embodiment, it should be appreciated that the mating surface from the superalloy part should fit over the mating surface of the work piece, especially since the superalloy part is comparable to the size and shape of the damaged portion. The mating surfaces cannot be randomly placed against each other, but they need to be positioned such that the work piece and the superalloy part can form a whole component smoothly.

Alternatively, the mating surfaces may have interlocking sections in a repair context. It may be worthwhile to create interlocking sections on the work piece and superalloy part if, for example, removal of the damaged portion created a surface that is difficult to mate a replacement piece to. The geometry and configuration of the interlocking sections may be influenced by the existing condition of the surface after the damaged portion has been removed, such as creating a more symmetrical pattern out of jagged protrusions from the work piece surface. When using interlocking sections on the mating surfaces, precise alignment of the work piece and the superalloy part is required to position the interlocking sections so that they fit into the corresponding area on the other mating surface, as described in the previous embodiments associated with the joining process 100. Shrink-fitting may be used to create a very snug fit between the interlocking sections, as described before.

Just as in the other embodiments, any means known in the art can be used to bring these mating surfaces together during step 230. After the mating surfaces are in place, pressure is applied to the work piece and superalloy part to provide intimate contact between the mating surfaces, closing off any gaps that may be present. As noted before, any means known in the art can be used to apply pressure, as long as pressure can be applied in a controlled manner so that the work piece and superalloy part do not get inadvertently damaged.

Subsequently in step 240, the outer edges along the joint are sealed, to keep out any contamination or fluid leakage into the joint. Similar to step 130, a seal weld is the preferred means to seal off the outer edges of the joint, although any other suitable means can be used, such as using a high temperature wax, as long as the sealing media or method provides a seal that can withstand the high temperature and pressure conditions associated with HIP.

In step 250, the joined work piece and superalloy part undergo HIP. As mentioned earlier, the operational pressure range of HIP is generally 100 to 200 MPa. The operational temperature ranges of HIP can be within 50% to 80% of the materials' melting temperature. HIP serves the same purpose here as in step 140. HIP not only re-conditions the microstructure of the materials involved, which fortifies the materials' underlying strength, but also facilitates the formation of a strong metallurgical bond between the work piece and the superalloy part by closing off any gaps left after pressure has been applied to the mating surfaces.

It should be appreciated that the above embodiments also provide an improved method to enable the joining of superalloy metallic parts to repair hot section turbine components beyond the lower stress regions of the components. Repairs are no longer limited to the lower stress regions of the airfoil because welding with low strength weld fillers to create a weld joint has been eliminated. Instead, the joint area of the superalloy metallic parts are "fused" together via an application of pressure, the sealing of the joint's edges, and HIP, thereby creating a superior metallurgical bond suitable to withstand all stress loads. This improved method for repair offers great promise to save on turbine replacement costs by enabling more repairs to occur along the entire hot section turbine components.

While the foregoing description and drawing represent various embodiments of the present invention, it should be appreciated that the foregoing description should not be deemed limiting since additions, variations, modification, and substitutions may be made without departing from the spirit and scope of the present invention. It will be clear to one of skill in the art that the present invention may be embodied in other forms, structures, arrangements, proportions and using other elements, materials and components. For example, although the method has been described in terms of joining superalloy metallic parts, the method can be adapted for use with other types of steel or metals. The present disclosed embodiments are, therefore, to be considered in all respects as illustrative and not restrictive, the scope of the invention being indicated by the appended claims and not limited to the foregoing description.

What is claimed is:

1. A method for joining superalloy metallic members for repairing a superalloy turbine blade comprising:
    preparing a surface of a first superalloy metallic member, thereby providing a clean and an oxide-free surface, wherein said surface of said first superalloy metallic member comprises a first interlocking section;
    preparing a surface of a second superalloy metallic member, thereby providing a clean and an oxide-free surface, wherein said surface of the second superalloy metallic member comprises a second interlocking section wherein said second interlocking section corresponds to said first interlocking section;
    interlocking said first interlocking section with said second interlocking section such that said first interlocking section directly contacts said second interlocking section;
    applying pressure to said first and second superalloy metallic members, thereby forcing said clean and oxide-free surface of said first superalloy metallic member directly against said clean and oxide-free surface of said second superalloy metallic member thereby forming a joint area;
    sealing an outer edge of said joint area to form a sealed joint area, with the proviso that said sealing is not performed by brazing; and
    subjecting said members and said sealed joint area to a hot isostatic process operation.

2. The method of claim 1, wherein said preparing is selected from the group consisting of, grit blasting, grinding, polishing, and chemical cleaning.

3. The method of claim 1, wherein said sealing comprises applying a seal weld.

4. The method of claim 1, wherein said sealing step comprises applying a sealing media.

5. The method of claim 4, wherein said sealing media comprises a high temperature wax.

6. The method of claim 1, wherein said interlocking further comprises shrink-fitting said first interlocking section with said second interlocking section wherein said shrink-fitting comprises:
    cooling said first interlocking section to a temperature below room temperature;
    fitting said cooled first interlocking section into said second interlocking section; and
    warming said interlocking sections to room temperature.

7. A method for joining superalloy metallic members for repairing a superalloy turbine blade comprising:
    preparing a surface on a first superalloy metallic member, thereby providing a clean surface on said first superalloy metallic member;
    preparing a surface on a second superalloy metallic member, thereby providing a clean surface on said second superalloy metallic member;
    positioning said clean surface on said first superalloy metallic member physically against said clean surface on said second superalloy metallic member tightly together, thereby causing direct contact between said clean surface on said first superalloy metallic member and said clean surface on said second superalloy metallic member and forming a joint area;
    applying pressure on said first superalloy metallic member and said second superalloy metallic member to force said clean surface on said first superalloy metallic member and said clean surface on said second superalloy metallic member closer together;
    sealing an outer edge of said joint area with a seal weld to form a sealed joint area, with the proviso that said sealing is not performed by brazing; and
    subjecting said first superalloy metallic member and said second superalloy metallic member and said sealed joint area to a hot isostatic processing operation.

8. The method of claim 7, wherein said surface on said first superalloy metallic member and said surface on said second superalloy metallic member each comprises an interlocking section and wherein said positioning further comprises interlocking said interlocking section of said first superalloy metallic member with said interlocking section of said second superalloy metallic member, thereby forming said joint area.

9. A method for repairing a damaged superalloy turbine blade, comprising:
    removing a damaged portion from a damaged location of a superalloy turbine blade;
    preparing a surface of said superalloy turbine blade;
    preparing a surface of a superalloy metallic member configured to replace said damaged portion of said superalloy turbine blade;
    positioning said superalloy metallic member adjacent to said damaged location of said superalloy turbine blade such that the prepared surface of said superalloy metallic member directly contacts the prepared surface of said superalloy turbine blade;
    applying pressure to said superalloy turbine blade and said superalloy metallic member, thereby forcing said surface of said superalloy turbine blade directly against said surface of said superalloy metallic member together and forming a joint area;

sealing an outer edge of said joint area to form a sealed joint area; and subjecting said superalloy turbine blade and said superalloy metallic member and said sealed joint area to a hot isostatic process operation.

10. The method of claim 9, wherein said preparing is selected from the group consisting of grit blasting, grinding, polishing, and fluoride ion cleaning.

11. The method of claim 9, wherein said sealing comprises applying a seal weld.

12. The method of claim 9, wherein said sealing step comprises applying a sealing media.

13. The method of claim 12, wherein said sealing media comprises a high temperature wax.

14. The method of claim 9, wherein said surface of said superalloy turbine blade and said surface of said superalloy metallic member each has an interlocking section.

15. The method of claim 14, wherein said interlocking section of said superalloy turbine blade fits into said interlocking section of said superalloy metallic member, thereby forming said joint area during said positioning.

16. The method of claim 15, wherein said positioning further comprises shrink-fitting said superalloy metallic member to form said joint area.

17. The method of claim 16, wherein said shrink-fitting comprises lowering the temperature of said superalloy metallic member to below room temperature.

18. The method of claim 17, wherein said positioning further comprises warming said superalloy metallic member to room temperature after positioning said superalloy metallic member adjacent to said damaged location of said superalloy turbine blade.

19. The method of claim 15, wherein said positioning further comprises shrink-fitting said superalloy turbine blade to form said joint area.

20. A method for joining superalloy metallic parts, comprising:

providing a first superalloy metallic member with a first interlocking section and a second superalloy metallic member with a second interlocking section, wherein said first interlocking section can be fitted into a corresponding area in said second interlocking section;

preparing said first interlocking section of said first superalloy metallic member, thereby providing a clean surface on said first interlocking section;

preparing said second interlocking section of said second superalloy metallic member, thereby providing a clean surface on said second interlocking section;

positioning said first interlocking section of said first superalloy metallic member into said corresponding area in said second interlocking section of said second superalloy metallic member, thereby causing direct contact between said clean surface of said first interlocking section and said clean surface of said second interlocking section and forming a joint area;

applying pressure on said first superalloy metallic member and said second superalloy metallic member to force said clean surface of said first interlocking section of said first superalloy metallic member directly against said clean surface of said second interlocking section of said second superalloy metallic member;

sealing an outer edge of said joint area to form a sealed joint area, with the proviso that said sealing is not performed by brazing; and subjecting said first superalloy metallic member and said second superalloy metallic member and said sealed joint area to a hot isostatic processing operation.

21. The method of claim 20, wherein said sealing comprises applying a seal weld.

22. The method of claim 20, wherein said sealing step comprises applying a sealing media.

23. The method of claim 22, wherein said sealing media comprises a high temperature wax.

24. The method of claim 20, further comprising a preliminary step of creating the first interlocking section and the second interlocking section.

25. The method of claim 20, wherein said positioning further comprises shrink-fitting said superalloy metallic members to form said joint area.

26. A method for repairing a superalloy turbine blade, comprising:

removing a damaged portion from a damaged location of a superalloy turbine blade;

creating a first interlocking section of said superalloy turbine blade;

creating a second interlocking section of a superalloy repair member, wherein said superalloy repair member is configured to replace said damaged portion of said superalloy turbine blade and wherein said first interlocking section can be fitted into a corresponding area in said second interlocking section;

preparing said first interlocking section of said superalloy turbine blade, thereby providing a clean surface on said first interlocking section;

preparing said second interlocking section of said superalloy repair member, thereby providing a clean surface on said second interlocking section;

positioning said first interlocking section of said superalloy turbine blade into said corresponding area in said second interlocking section of said superalloy repair member, thereby causing direct contact between said clean surface of said first interlocking section and said clean surface of said second interlocking section and forming a joint area;

applying pressure on said superalloy turbine blade and said superalloy repair member to force said clean surface of said first interlocking section of said superalloy turbine blade directly against said clean surface of said second interlocking section of said superalloy repair member;

sealing an outer edge of said joint area to form a sealed joint area; and subjecting said superalloy turbine blade, said superalloy repair member, and said sealed joint area to a hot isostatic processing operation.

27. The method of claim 26, wherein said positioning further comprises shrink-fitting the superalloy turbine blade and the superalloy repair member, wherein said shrink-fitting comprises reducing the temperature of said superalloy repair member to a temperature less than room temperature.

28. A method for repairing a superalloy turbine blade, comprising:

removing a damaged portion of said sup eralloy turbine blade;

creating a first interlocking section comprising a clean surface of said superalloy turbine blade;

creating a second interlocking section comprising a clean surface of a superalloy repair member, wherein said superalloy repair member is configured to replace said damaged portion of said superalloy turbine blade and wherein said second interlocking section can be fitted into a corresponding area in said first interlocking section;

positioning said second interlocking section of said superalloy repair member into said corresponding area in said first interlocking section causing direct contact of said second interlocking section and said first interlocking section while the superalloy repair member is at a first temperature lesser than room temperature, thereby forming a joint area;

applying pressure on said superalloy turbine blade and said superalloy repair member to force said clean surface of said superalloy repair member directly against said clean surface of said superalloy turbine blade;

waiting for said superalloy repair member to reach a second temperature greater than said first temperature;

sealing an outer edge of said joint area to form a sealed joint area; and subjecting said superalloy turbine blade, said superalloy repair member, and said sealed joint area to a hot isostatic processing operation.

* * * * *